United States Patent [19]

Scholz et al.

[11] 4,093,274
[45] June 6, 1978

[54] UPPER FITTING OF A SHOULDER STRAP ARRANGED DISPLACEABLE IN HEIGHT WITHIN A BODY HOLLOW SPACE

[75] Inventors: Hansjürgen Scholz, Echterdingen; Jürgen Gimbel, Gechingen; Walter Jahn, Sindelfingen, all of Germany

[73] Assignee: Daimler-Benz Aktiengesellschaft, Germany

[21] Appl. No.: 740,940

[22] Filed: Nov. 11, 1976

[30] Foreign Application Priority Data

Nov. 15, 1975 Germany .............................. 2551329

[51] Int. Cl.² ............................................. B60R 21/02
[52] U.S. Cl. .................................................. 280/747
[58] Field of Search ............. 280/747, 745; 180/82 C; 297/388, 389; 24/164; 248/345, 243; 52/221

[56] References Cited

U.S. PATENT DOCUMENTS

| 2,130,307 | 9/1938 | McGovern | 248/345 X |
| 3,604,669 | 9/1971 | Asher | 248/345 X |
| 3,941,419 | 3/1976 | Blom | 297/388 X |

FOREIGN PATENT DOCUMENTS

| 2,303,222 | 8/1974 | Germany | 297/389 |
| 2,344,287 | 3/1975 | Germany | 280/747 |

*Primary Examiner*—Evon C. Blunk
*Assistant Examiner*—Michael J. Forman
*Attorney, Agent, or Firm*—Craig & Antonelli

[57] ABSTRACT

An upper fitting of a shoulder belt which is arranged displaceable in height within a body hollow space; the outlet opening for the belt band out of the hollow space is covered off by a shield which in its turn is provided with an aperture for the belt band, whereby the position of the aperture is adapted to be matched to the height adjustment of the fitting.

10 Claims, 5 Drawing Figures

UPPER FITTING OF A SHOULDER STRAP ARRANGED DISPLACEABLE IN HEIGHT WITHIN A BODY HOLLOW SPACE

The present invention relates to an upper fitting of a shoulder strap, especially to a deflection fitting of a three-point safety belt system with automatic reel-up mechanism, which is arranged displaceable in height within a hollow space of the body.

The hollow space of the body accommodating the automatic reel-up mechanism which may, for example, be formed by a center column of a motor vehicle, must be provided with an opening for the passage therethrough of the belt band, whose height has to correspond to the adjusting path of the deflection fitting. The relatively large opening which necessarily results therefrom appears unpleasing to the observer and entails the danger that foreign bodies may reach the body hollow space, which may impair the functioning ability of the automatic reeling mechanism.

It is therefore the task of the present invention to provide an installation by means of which the size of the visible part of the aperture can be considerably reduced with simultaneous adaptation to the respective belt outlet place, while avoiding the aforementioned disadvantages and maintaining a simple height adjustability of the fitting.

Accordingly, it is proposed according to the present invention with a fitting of the aforementioned type to cover the outlet opening for the belt band by a shield which, in its turn, includes an aperture for the passage of the belt band, whereby the position of the aperture can be matched to the height adjustment of the fitting.

In one embodiment of the present invention, the shield may be guided displaceable in height along the outer side or the inner side of the body hollow space.

However, it is also possible to arrange the aperture—matched to the outlet direction of the belt band—offset eccentrically by about half the adjusting height of the fitting and to provide fastening possibilities at the shield, which are in alignment with the coordinated female receptacles in the hollow space walls upon rotation of the shield by 180°.

It is additionally of advantage if the aperture is delimited on all sides by the shield and the same thus cannot be lost.

Accordingly, it is an object of the present invention to provide an upper fitting for a shoulder belt, arranged displaceable in height within a hollow space of the body, which avoids by simple means the aforementioned shortcomings and drawbacks encountered in the prior art.

Another object of the present invention resides in an upper fitting of a shoulder belt of a three-point safety belt system with an automatic reeling mechanism, which is pleasing to the observer, avoids large apertures that impair the appearance of the passenger space and prevents the penetration of particles that may impair the reliability of operation of the automatic reeling mechanism for the belt system.

A further object of the present invention resides in an upper fitting for a shoulder belt of the type described above which is simple in construction, assures a simple height adjustability thereof, and permits a considerable reduction of the size of the visible part of the aperture for the belt outlet.

Still a further object of the present invention resides in an upper fitting for a shoulder belt which entails all of the aforementioned advantages, yet permits a simple adjustment of the height of the opening for the belt.

These and other objects, features, and advantages of the present invention will become more apparent from the following description when taken in connection with the accompanying drawing which shows, for purposes of illustration only, two embodiments in accordance with the present invention and wherein.

Figure 1:
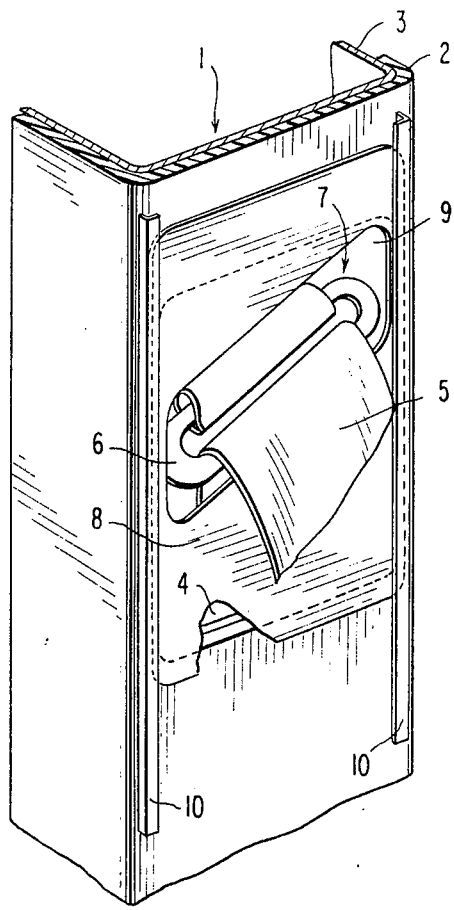
FIG. 1 is a perspective view of an arrangement of an upper fitting of a shoulder belt in accordance with the present invention provided with a shield steplessly adjustable in height at a covering part.
Figure 4:
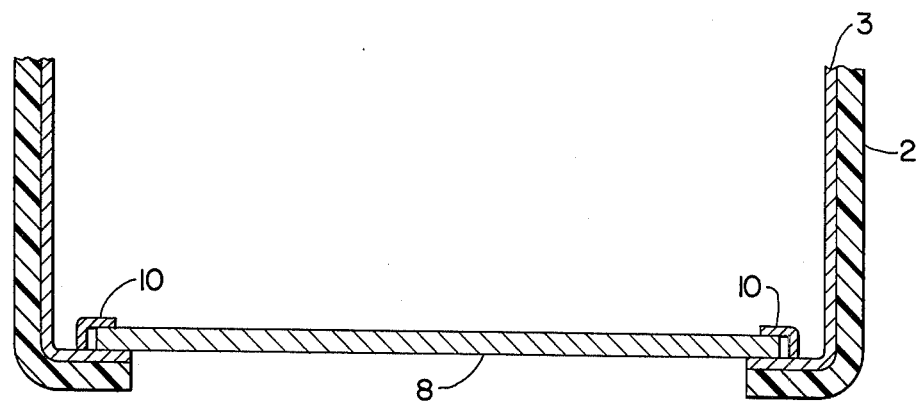
Figure 5:
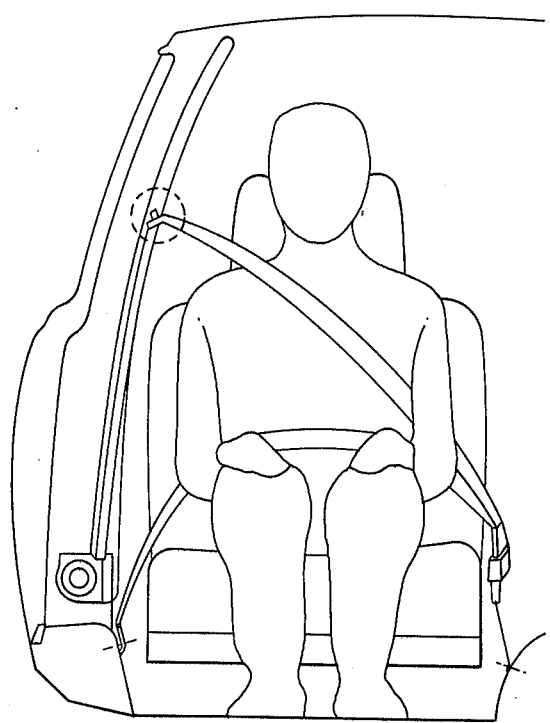

FIG. 4 is a schematic cross-section of an arrangement of the type shown in FIG. 1 wherein the shield is guided displaceable in height along the inner side of the body hollow space instead of the outer side as shown in FIG. 1; and FIG. 5 is a schematic illustration of an upper fitting of a shoulder belt band of this invention as a deflection fitting in a three-point safety belt system with automatic reel-up mechanism.

Referring now to the drawing wherein like reference numerals are used throughout the various views to designate like parts, a belt band 5 which is adapted to be unreeled and reeled-up by a conventional automatic reel-up mechanism (not shown), extends through an outlet opening 4 out of a hollow body space generally designated by reference numeral 1 which is surrounded, for example, by a center column 3 of a passenger motor vehicle, not illustrated in detail and provided with a conventional covering 2. A fitting generally designated by reference numeral 7 which is constructed as a deflection fitting 6 is thereby arranged inside of the body hollow space 1 in such a manner as to be displaceable or adjustable in height. A shield 8 covering on the outside the outlet opening 4 provided in the covering 2 and in the center column 3 which in its turn is provided with an aperture or passage 9, covers the outlet opening 4 in such a manner that even in both extreme positions of the fitting 7, the outer edges of the outlet opening 4 remain covered.

For purposes of adapting the aperture 9 of the shield 8 to the respective fastening place of the fitting 7, the shield 9 is guided displaceable in height in two lateral ledges or channels 10—as can be seen from FIG. 1.

Figure 2:
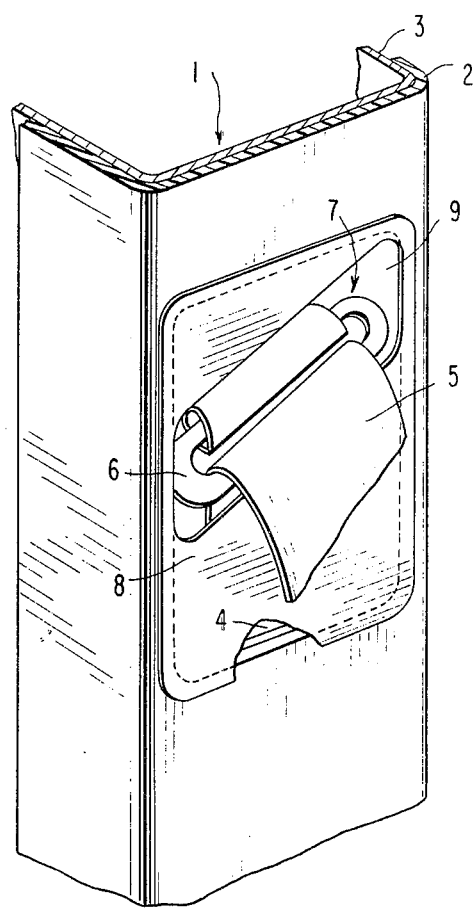
FIG. 2 is a perspective view of a modified embodiment of an arrangement of an upper fitting for a shoulder belt in accordance with the present invention with a shield secured at a body part which can be adapted to be reversed by 180° by plug-in connections, illustrating the shield in its upper position.
Figure 3:
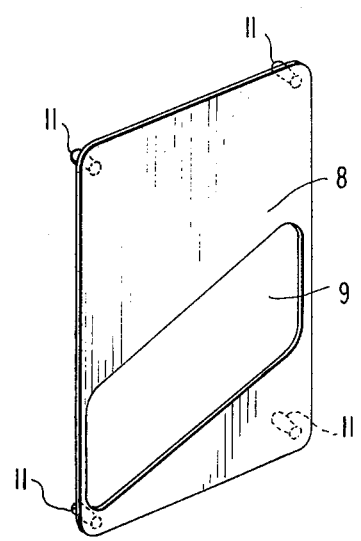
FIG. 3 is a perspective view of the shield of FIG. 2 in its lower position in which it has been rotated through 180°.

The shield 8 according to FIGS. 2 and 3 is provided on its backside with fastening possibilities 11 in the form of plug-in pins or the like (FIG. 3) which can be inserted or plugged-in in complementary receiving means (not shown) of the covering 2 and/or of the center column 3. The aperture 9 which as in the embodiment according to FIG. 1, extends matched to the outlet direction of the belt band 5, according to FIGS. 2 and 3, is arranged eccentrically offset in the shield 8 by about half the adjusting height of the fitting 7 so that the two illustrated fastening positions result from a rotation through 180°.

The shield 8 according to FIG. 4 is arranged on the inner side of the body hollow space surrounded by center column 3 and conventional covering 2. The arrangement is merely the inverse of that in FIG. 1, that is, the shield 8 is guided displaceable in height in two lateral ledges or channels 10.

In FIG. 5, the upper fitting of the shoulder belt (within the dotted circle) is shown schematically as a deflection fitting in a three-point safety belt system with automatic reel-up mechanism.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An upper fitting of a shoulder belt band arranged adjustable in height within a body hollow space means provided with an outlet opening for the belt band, characterized in that the outlet opening is covered off by a shield means which in turn is provided with an aperture for the belt band, and in that the position of the aperture is adapted to be matched to the adjusted height of the fitting.

2. A fitting according to claim 1, characterized in that the fitting is a deflection fitting of a three-point safety belt system provided with an automatic reel-up mechanism.

3. A fitting according to claim 1, characterized in that the shield means is guided displaceable in height along walls defining the hollow space means.

4. A fitting according to claim 3, characterized in that the shield means is guided displaceable in height along the outside of the body hollow space means.

5. A fitting according to claim 3, characterized in that the shield means is guided displaceable in height along the inside of the hollow space means.

6. A fitting according to claim 1, characterized in that the aperture, matched to the outlet direction of the belt band, is arranged offset eccentrically by about half the adjusting height of the fitting, and in that fastening means are provided at the shield means, which upon rotation of the shield means by 180° are in alignment with associated receiving means provided in walls of the hollow space means.

7. A fitting according to claim 1, characterized in that the aperture is delimited on all sides by the shield means.

8. A fitting according to claim 7, characterized in that the fitting is a deflection fitting of a three-point safety belt system provided with an automatic reel-up mechanism.

9. A fitting according to claim 8, characterized in that the shield means is guided displaceable in height along walls defining the hollow space means.

10. A fitting according to claim 8, characterized in that the aperture, matched to the outlet direction of the belt band, is arranged offset eccentrically by about half the adjusting height of the fitting, and in that fastening means are provided at the shield means, which upon rotation of the shield means by 180° are in alignment with associated receiving means provided in walls of the hollow space means.

* * * * *